United States Patent
Mukherjee (10) Patent No.: US 10,755,047 B2
(45) Date of Patent: Aug. 25, 2020

(54) AUTOMATIC APPLICATION OF REVIEWER FEEDBACK IN DATA FILES

(71) Applicant: Microsoft Technology Licensing, LLC, Redmond, WA (US)

(72) Inventor: Kaustav Mukherjee, Kolkata (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/471,679

(22) Filed: Mar. 28, 2017

(65) Prior Publication Data

US 2018/0285338 A1 Oct. 4, 2018

(51) Int. Cl.
G06F 40/284 (2020.01)
G06F 40/205 (2020.01)
G06F 40/253 (2020.01)
G06F 40/295 (2020.01)

(52) U.S. Cl.
CPC .......... *G06F 40/284* (2020.01); *G06F 40/205* (2020.01); *G06F 40/253* (2020.01); *G06F 40/295* (2020.01)

(58) Field of Classification Search
CPC .. G06F 17/277; G06F 17/2705; G06F 17/274; G06F 17/278
USPC ........................................................ 715/256
See application file for complete search history.

(56) References Cited

U.S. PATENT DOCUMENTS

| | | | |
|---|---|---|---|
| 4,887,212 A * | 12/1989 | Zamora | G06F 17/2705 704/8 |
| 7,043,690 B1 * | 5/2006 | Bates | G06F 40/295 715/234 |
| 7,236,923 B1 * | 6/2007 | Gupta | G06F 40/284 704/9 |
| 7,401,286 B1 * | 7/2008 | Hendricks | G06F 17/2235 715/203 |
| 7,512,618 B2 | 3/2009 | Farchi et al. | |
| 7,698,626 B2 * | 4/2010 | Baluja | G06F 40/295 715/205 |
| 7,730,389 B2 * | 6/2010 | Rasmussen | G09B 29/106 715/208 |

(Continued)

OTHER PUBLICATIONS

Huang, et al., "Automotive diagnosis typo correction using domain knowledge and machine learning", In Proceedings of IEEE Symposium on Computational Intelligence and Data Mining, Apr. 16, 2013, 8 pages.

(Continued)

*Primary Examiner* — Stephen S Hong
*Assistant Examiner* — Broderick C Anderson
(74) *Attorney, Agent, or Firm* — Michael Best & Friedrich LLP (57) ABSTRACT

Systems and methods for editing data files. One system includes a processor. The processor is configured to receive reviewer feedback associated with a first portion of content included in a data file, analyze the reviewer feedback using natural language processing to determine an edit to the first portion of the content included in the data file, and apply the edit to the first portion of the content included in the data file. The processor is also configured to determine a second portion of the content included in the data file based on the reviewer feedback and apply the edit to the second portion of the content included in the data file.

19 Claims, 7 Drawing Sheets

(56) References Cited

U.S. PATENT DOCUMENTS

| | | | |
|---|---|---|---|
| 7,966,556 B1* | 6/2011 | Bourdev | G06F 3/1256 |
| | | | 715/230 |
| 8,346,563 B1* | 1/2013 | Hjelm | G10L 15/1822 |
| | | | 379/88.01 |
| 9,535,894 B2 | 1/2017 | Carrier et al. | |
| 2005/0125422 A1 | 6/2005 | Hirst | |
| 2012/0239380 A1* | 9/2012 | Cumby | G06F 17/2785 |
| | | | 704/9 |
| 2014/0019854 A1* | 1/2014 | Alexander | G06F 17/24 |
| | | | 715/266 |
| 2014/0222816 A1 | 8/2014 | Chen et al. | |
| 2015/0195295 A1 | 7/2015 | Sandler et al. | |
| 2016/0378741 A1 | 12/2016 | Mullins et al. | |

OTHER PUBLICATIONS

Huang, et al., "Intelligent typo correction for text mining through machine learning", In International Journal of Knowledge Engineering and Data Mining, vol. 3, No. 02, 2015, 1 pages.

Lam, et al., "Automatic Text Categorization and Its Application to Text Retrieval", In Journal of IEEE Transactions on Knowledge and Data Engineering vol. 11, Issue 6, Nov. 1999-##, pp. 865-879.

"Choose AutoCorrect options for capitalization, spelling, and symbols", https://support.office.com/en-us/article/Choose-AutoCorrect-options-for-capitalization-spelling-and-symbols-e7433b94-f3de-4532-9dc8-b29063a96e1f, Retrieved on: Jan. 24, 2017, 4 pages.

* cited by examiner

AUTOMATIC APPLICATION OF REVIEWER FEEDBACK IN DATA FILES

FIELD

Embodiments described herein relate to automatically applying reviewer comments to the content in a data file.

SUMMARY

Document review commonly occurs in business, publishing, research, and other fields. Authors provide draft documents as data files to reviewers. The reviewers provide feedback, such as in the form of comments associated with specific content (text, images, and the like) in the data file and embedded in the content or added to a reviewer sidebar or other reviewing dialog box or window. The comments instruct the author to make edits to the content (editing the content itself, editing the formatting of the content, and the like). In some situations, reviewer feedback may instruct an author to make an edit not only to specifically-marked content but also to identical content or similar content within the data file. For example, reviewer feedback may instruct an author to edit the same word and similar words throughout the data file. In these situations, the author expends considerable time manually locating each occurrence of the word or similar words in the data file and correctly and consistently applying the edit to each occurrence. Thus, this process can be time consuming and error prone.

Accordingly, embodiments described herein automatically analyze reviewer feedback and automatically apply an edit to the content included in a data file based on the reviewer feedback. In some embodiments, analyzing the reviewer feedback includes applying natural language processing to determine a noun phrase, a verb phrase, and, optionally, a modifier within the reviewer feedback. For example, assume example reviewer feedback is "capitalize all state names" and is associated with the word "wyoming" appearing in the data file. This reviewer feedback includes the noun phrase "state names," the verb phrase "capitalize," and the modifier "all." Based on these components of the feedback, the word "wyoming" can be automatically updated to "Wyoming" with a capital "W." In some embodiments, an edit can be applied to both content associated with reviewer feedback and identical or similar content in the same file or multiple files. For example, continuing with the previous example, in the situation where the data file includes additional occurrences of the word "wyoming" and includes the words "montana" and "oregon," this content can also be automatically updated to change each "wyoming" to "Wyoming," change each "montana" to "Montana," and change each "Oregon" to "Oregon." In some embodiments, the author (or the reviewer) may also manage (approve or decline) when edits are automatically applied. For example, potential edits determined by the feedback application 152 for the content may be displayed to an author for his or her approval before the edits are automatically applied.

For example, one embodiment provides a system for editing data files. The system includes a processor. The processor is configured to receive reviewer feedback associated with a first portion of content included in a data file, analyze the reviewer feedback using natural language processing to determine an edit to the first portion of the content included in the data file, and apply the edit to the first portion of the content included in the data file. The processor is also configured to determine a second portion of the content included in the data file based on the reviewer feedback and apply the edit to the second portion of the content included in the data file.

Another embodiment provides a method for applying edits to data files. The method includes receiving reviewer feedback associated with a data file, and analyzing, with a processor, the reviewer feedback using natural language processing to determine an edit to the data file. Analyzing the reviewer feedback to determine the edit includes separating the reviewer feedback into a plurality of lexical tokens, determining, based on the plurality of lexical tokens, a noun phrase included in the reviewer feedback, determining, based on the plurality of lexical tokens, a verb phrase included in the reviewer feedback, combining the noun phrase and the verb phrase to generate a combined phrase, and comparing the combined phrase to each of a plurality of possible combined phrases. The method also includes, in response to the combined phrase matching a possible combined phrase included in the plurality of possible combined phrases, determining the edit to the data file based on the possible combined phrase, determining content included in the data file based on the reviewer feedback, and applying the edit to the content included in the data file.

A further embodiment provides non-transitory, computer-readable medium including instructions executable by a processor to perform a set of functions, the set of functions includes receiving reviewer feedback associated with text included in a data file, and analyzing the reviewer feedback using natural language processing to determine an edit to the text. Analyzing the reviewer feedback to determine the edit includes separating the reviewer feedback into a plurality of lexical tokens, determining, based on the plurality of lexical tokens, a noun phrase included in the reviewer feedback, determining, based on the plurality of lexical tokens, a verb phrase included in the reviewer feedback, and determining the edit to the text based on the noun phrase and the verb phrase. The set of functions also includes applying the edit to the text included in the data file, determining additional text included in the data file based on the reviewer feedback, and applying the edit to the additional text included in the data file.

DETAILED DESCRIPTION

One or more embodiments are described and illustrated in the following description and accompanying drawings.

These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more processors configured to perform the described functionality by executing instructions stored in non-transitory, computer-readable medium. Similarly, embodiments described herein may be implemented as non-transitory, computer-readable medium storing instructions executable by one or more processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, a DVD, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, when an author creates a data file, such as a text document for publication, the author may submit the data file to a reviewer for feedback. The reviewer reviews the content included in the data file and provides reviewer feedback, such as in the form of comments. These comments may occur in a sidebar of a data file creation software application (a word processing software application), in comment dialog boxes, or the like. The author receives the reviewer feedback and manually addresses the reviewer feedback by making edits to the content included in the data file accordingly. In some embodiments, the reviewer feedback may be associated with a portion of content in the data file (a word or phrase) but the reviewer may request that the feedback be applied to other portions of the content, such as the entire file or even other files. Accordingly, manually applying the feedback and making appropriate edits is a time-consuming process and error-prone process. This is especially true when the reviewer feedback needs to be applied to all occurrences of both identical content and similar content within a data file. For example, software tools that allow a user to find and optionally replace text in a data file with other text does not allow a user to identify all state names, proper names, or the like and automatically capitalize each of these names. Similarly, reviewer feedback may extend past pure grammatical changes and may represent a style or preference. Hence, existing software tools that provide spelling and grammar review and correction may fail to identify and update content consistent with a particular reviewer's feedback.

Thus, embodiments described herein provide, among other things, systems and methods for automatically applying reviewer feedback to the content included in a data file. For example, the embodiments described automatically analyze reviewer feedback to determine an edit to the content in a data file and apply the edit to the associated content, and, optionally, to additional content in the data file.

Figure 1:
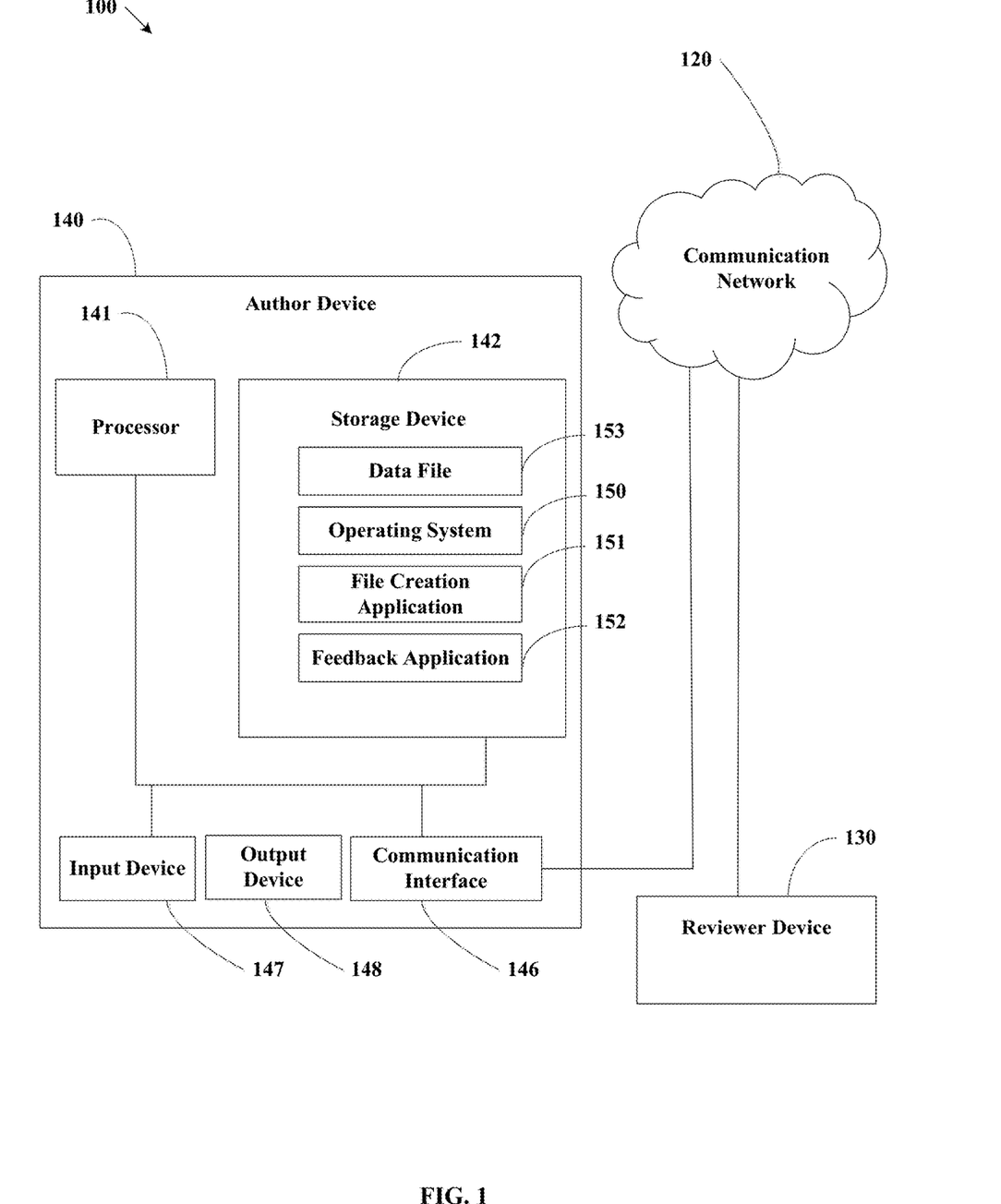
FIG. 1 schematically illustrates a system for automatically applying edits to the content included in a data file according to one embodiment.

FIG. 1 illustrates a system 100 for automatically applying reviewer feedback to the content included in a data file according to one embodiment. The system 100 includes a communication network 120, a reviewer device 130, and an author device 140. The communication network 120 or portions thereof may be implemented using a wide area network, such as the Internet, a local area network, such as a Bluetooth™ network or Wi-Fi, and combinations or derivatives thereof. As described in more detail below, the author device 140 may transmit a data file to the reviewer device 130 over the communication network 120 (attached to an email, through a shared link, and the like) and may receive feedback from the reviewer device 130 over the communication network 120. It should also be understood that, in some embodiments, the author device 140 and the reviewer device 130 may communicate over a dedicated connection or may be the same device (an author and a reviewer use the same device to create and edit a data file). Also, in some embodiments, the data file exchanged between the author device 140 and the reviewer device 130 may be stored on an intermediate device, such as an application server, a file hosting server, or the like. For example, in some embodiments, the author device 140 may access a server to create a data file and, thereafter, the reviewer device 130 may access the server (or another server) to access the data file and provide reviewer feedback, which the author device 140 may similarly access through the server (or another server). Thus, it should be understood that the author device 140 and the reviewer device 130 may exchange the data file in a variety of configurations and embodiments described herein are not limited to any particular configuration of communication or operation. As used in the present application, a data file is a computer-readable file containing data stored in a computer-readable medium. In some embodiments, the data includes human-readable data, such as a word-processing document, a spreadsheet, a presentation, a database record, source code, and the like.

The author device 140 is a computing device, for example a laptop computer, a desktop computer, a tablet computer, a smart phone, or other device that executes one or more software applications for creating and editing the content included in data files. As illustrated in FIG. 1, the author device 140 may include a processor 141 (for example, a microprocessor, application-specific integrated circuit (ASIC), or another suitable electronic device), a storage device 142 (for example, a non-transitory, computer-readable storage medium), and a communication interface 146 (for example, a transceiver) for communicating over the communication network 120 and other devices or networks external to the author device 140. The author device 140 also includes one or more input devices 147 (a touchscreen, a keyboard, a keypad, a stylus, a button, a touchpad, a mouse, or the like), one or more output devices 148 (a touchscreen, a display, a speaker, a printer, or the like), or a combination thereof. It should be understood that, in some embodiments, the author device 140 may include one or more devices that operate as both an input device and an output device, such as a touchscreen, rather than in or additional to separate input and output devices. It should be understood that the author device 140 may include additional components than those illustrated in FIG. 1 in various configurations and may perform additional functionality than the functionality described herein. It should also be understood that, in some embodiments, the reviewer device 130 includes similar components as the author device 140 illustrated in FIG. 1.

The processor 141, the storage device 142, the communication interface 146, the input device 147, and the output device 148 communicate wirelessly, over one or more wired communication lines or buses, or a combination thereof. The storage device 142 stores software (executable instructions) including, for example, an operating system 150, a file creation application 151, and a feedback application 152. The storage device 142 may also store data, such as a data file 153. It should be understood that, in some embodiments, the author device 140 may include more than one storage device and the operating system 150, the file creation application 151, and the feedback application 152 may be stored in separate storage devices. Also, it should be understood that the storage device 142 may include additional software and data.

The processor 141 is configured to retrieve software from the storage device 142 and execute the software, including the operating system 150 to manage reading and writing of data to the storage device 142, execution of other software applications, the input device 147 and the output device 148 and input and output provided there through, and the like. The processor 141 also executes the file creation application 151 to generate and output (display) one or more user interfaces through the output device 148 that allow a user (an author) to create and edit a data file using one or more input devices 147. For example, the file creation application 151 may include a word processing application, a spreadsheet application, a presentation application, a publication application, or the like. The reviewer device 130 may similarly execute (with a processor) the file creation application 151 (or a version thereof) to display a data file to a reviewer and receive reviewer feedback. In other embodiments, as described above, the file creation application 151 may be executed by a server (as part of a file hosting service or a cloud service) accessible by the author device 140 and the reviewer device 130.

The processor 141 included in the author device 140 also executes the feedback application 152 to apply edits to a data file based on reviewer feedback as described in more detail below. It should be understood that in some embodiments the feedback application 152 is included in the file creation application 151. Also, as described above for the file creation application 151, the feedback application 152 may be executable by a server accessible by the author device 140 and the reviewer device 130. Accordingly, in these situations, the author device 140 may create a data file and a server may apply edits to the data file based on feedback (received from the reviewer device 130, the author device 140, or both) through execution of the feedback application 152.

Figure 2:
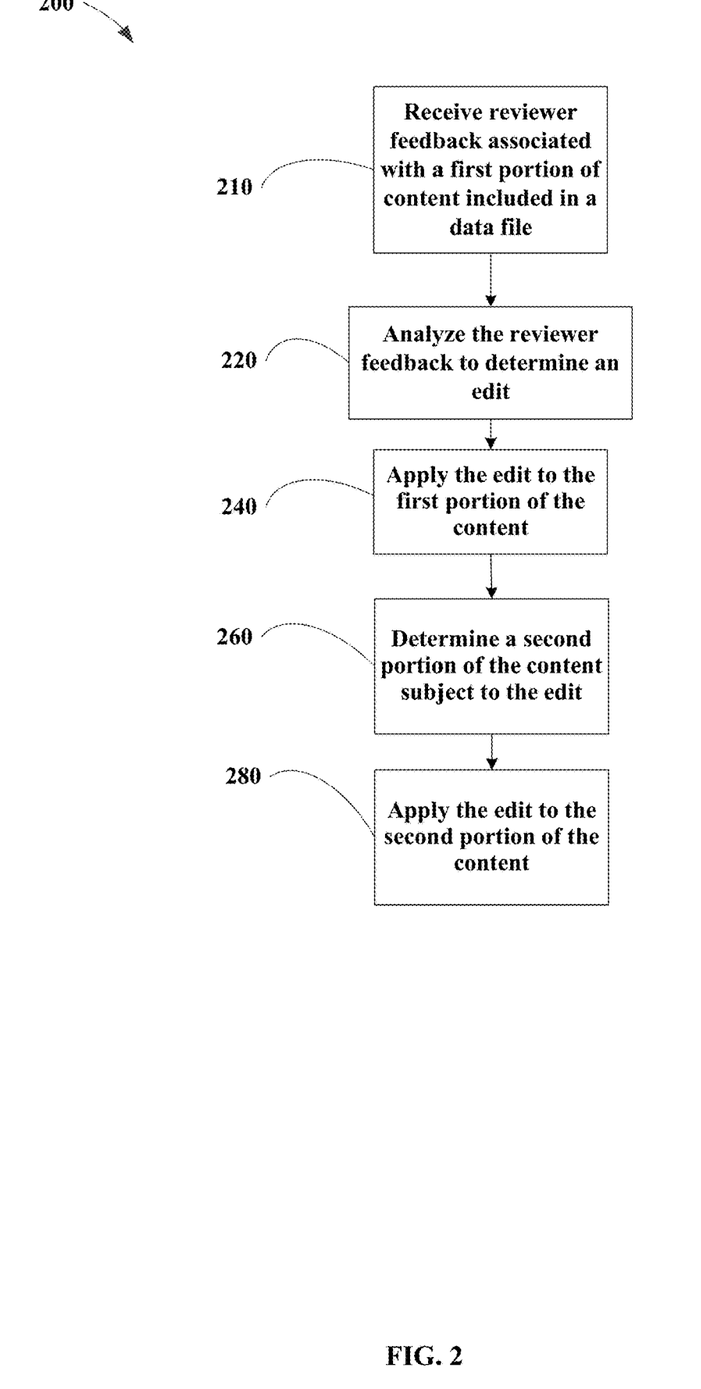
FIG. 2 is a flow chart illustrating a method for applying edits to the content included in a data file performed by the system of FIG. 1 according to one embodiment.

FIG. 2 illustrates a method 200 performed by the system 100 for analyzing and applying reviewer feedback to the contents of a data file. The method 200 is described below as being performed by the feedback application 152, which as described above, may be executed by the processor 141 included in the author device 140, a processor included in the reviewer device 130, a processor included in a server, or a combination thereof. As illustrated in FIG. 2, the method 200 includes receiving reviewer feedback associated with the content in the data file (at block 210). The reviewer feedback may be stored separate from the associated data file or may be included in the data file. For example, as noted above, in some embodiments, the reviewer feedback includes embedded comments or notes within the data file.

In some embodiments, the reviewer feedback includes unstructured natural language text that describes a requested edit to content included in a data file. For example, the reviewer feedback may include the text "Increase the indentation here," "Adorn all paragraphs or chapters with drop-caps," "Capitalize all paragraphs with no proper noun," "Capitalize all occurrences of 'the' in names," "Capitalize all names and locations," "Underline all phrases which have a historical context," "Start all paragraphs with a blank line above," "Mark all quotes in underline," "Remove indentation for quotes, just make the bold," "Mark all places as map links," "Mark all date times as selectable calendar links," "Don't put an apostrophe before the end in case of plural noun," and the like. As illustrated through the above examples, an edit may include, in some embodiments, a change to text included in a data file (deletion, addition, or modification), a change to the formatting or the structure of text included in an electronic document, the addition of links to text included in the data file, and the like. However, it should be understood that an edit applied based on reviewer feedback may include an edit to other types of content included in a data file, such as images, animations, graphics, and the like, and is not limited to text edits.

Figure 3:
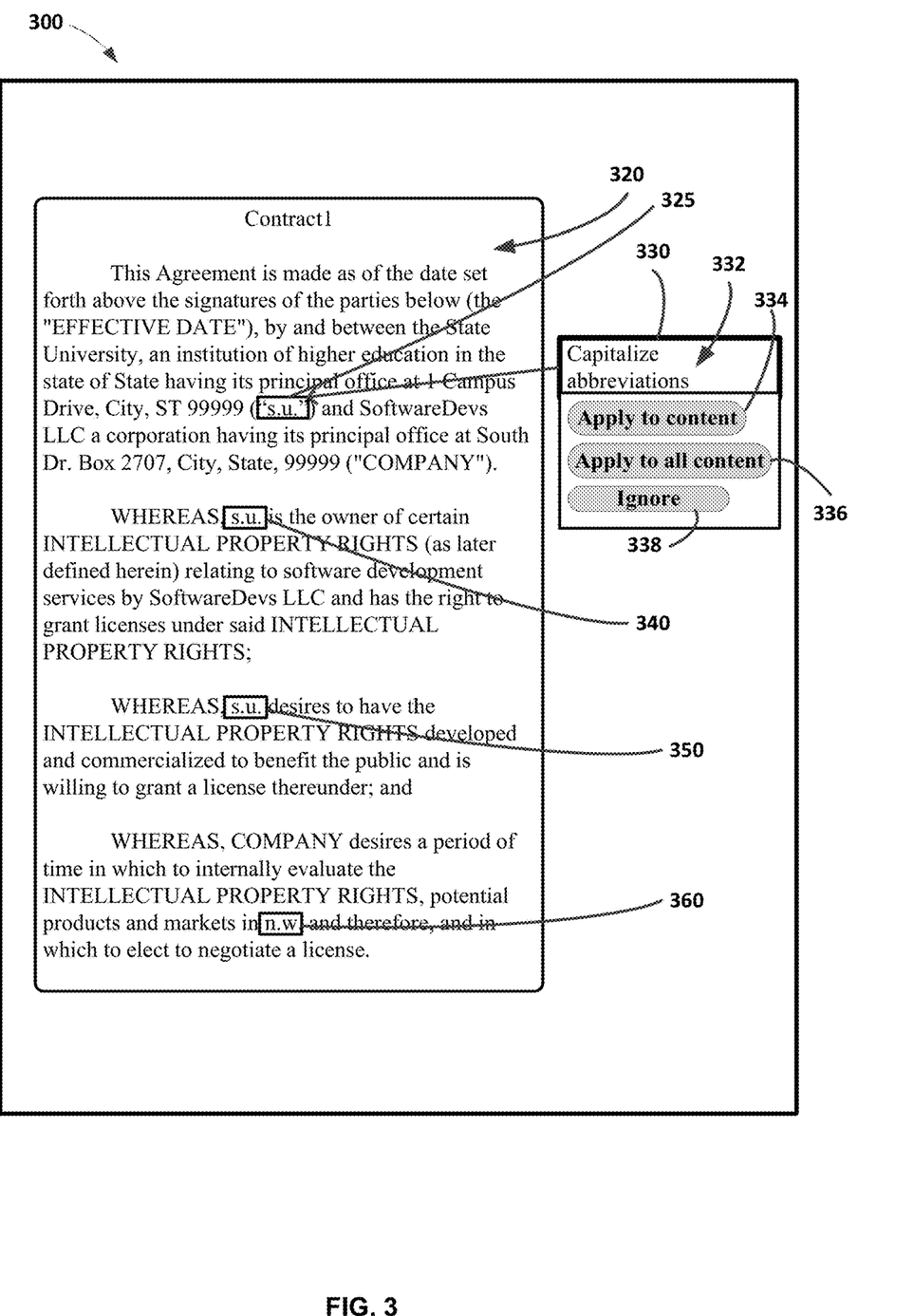
FIG. 3 illustrates a user interface for receiving reviewer feedback according to one embodiment.

FIG. 3 illustrates an example user interface 300 for receiving reviewer feedback. In some embodiments, the user interface 300 is presented within the file creation application 151 (as executed by the reviewer device 130). As illustrated in FIG. 3, the user interface 300 includes the content 320 of a data file and a feedback dialog box 330. The feedback dialog box 330 may be associated (linked) with a portion of the content 320 to associated reviewer feedback 332 entered through the feedback dialog box 330 to specific content within the data file. For example, as illustrated in FIG. 3, the feedback dialog box 330 may include an arrow or lead line marking a portion 325 of the content 320 that is associated with the reviewer feedback 332. In other embodiments, reviewer feedback may not be associated with a specific portion of the content 320 but may be provided as a general comment for the data file. As illustrated in FIG. 3, the feedback dialog box 330 allows the reviewer to enter a textual description of an edit, such as "Capitalize abbreviations." In some embodiments, in addition to the unstructured feedback dialog box, the user interface 300 may include a list of predetermined reviewer feedbacks, such as common or historical reviewer feedbacks (reviewer feedback routinely or previously provided for the data file being reviewer, other data files, or a combination thereof). Accordingly, rather than entering a textual description of an edit, a reviewer can select a predetermined feedback from a list. Selecting such a predetermined feedback allows the feedback application 152 to quickly analyze the feedback. For example, rather than parsing selected feedback as described below, the feedback application 152 may store a known edit with each predetermined feedback that the feedback application 152 may access to determine the edit to the apply for selected feedback.

Figure 4:
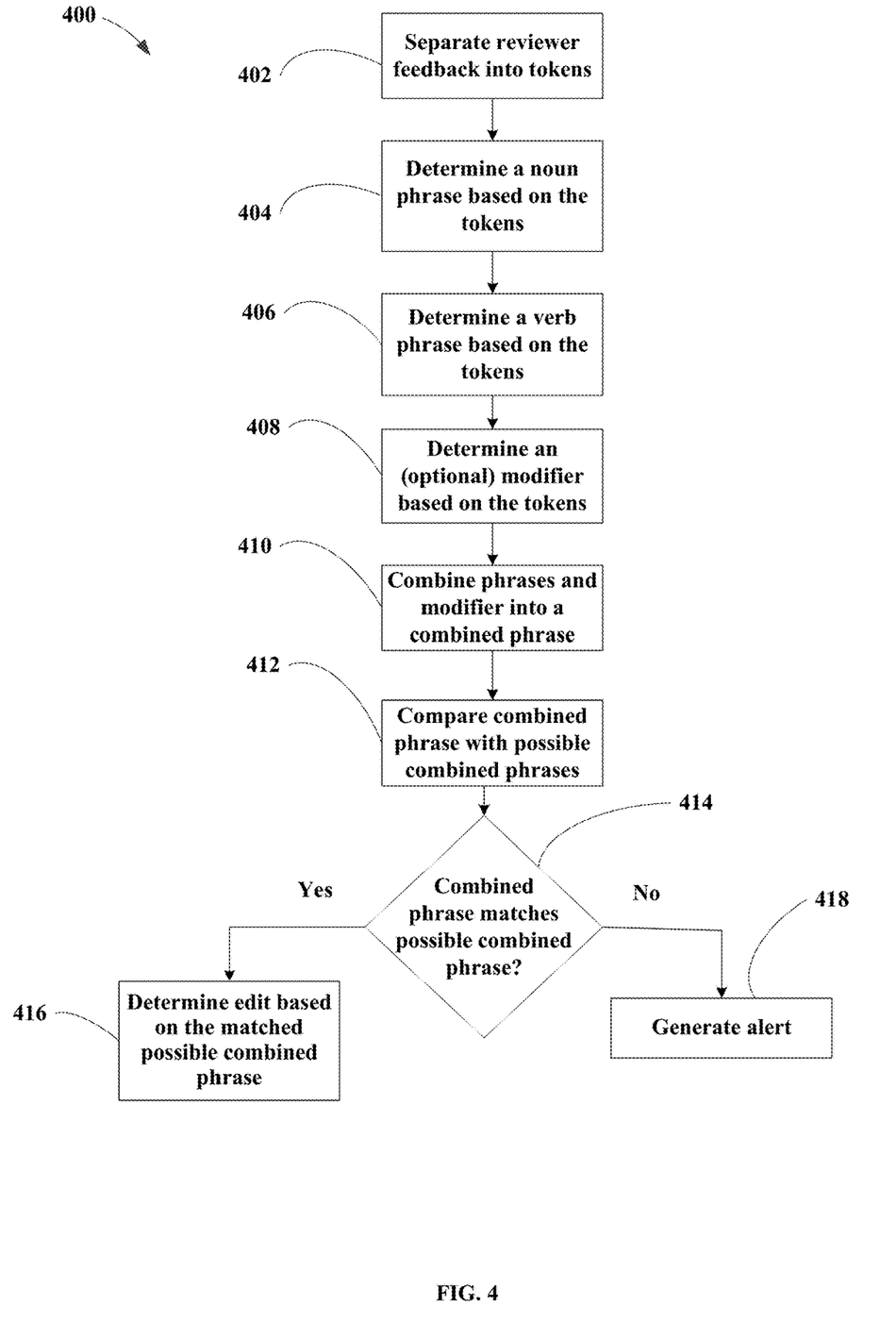
FIG. 4 is a flow chart illustrating a method for determining an edit to the content included in a data file performed by the system of FIG. 1 as part of the method of FIG. 2 according to one embodiment.

Returning to FIG. 2, the method 200 also includes analyzing the received reviewer feedback to determine at least one edit to apply to the content in the data file (at block 220). The feedback application 152 may determine the at least one edit by analyzing reviewer feedback using natural language processing. For example, FIG. 4 illustrates a method 400 for determining an edit by analyzing reviewer feedback using natural language processing. As illustrated in FIG. 4, the method 400 includes separating review feedback into at least one token (parsing) (at block 402). As described above, a reviewer may enter reviewer feedback as a phrase or sentence, which contains lexical tokens. In some embodiments, a lexical token is the smallest meaningful unit of a phrase or sentence and consists of one or more characters. For example, in the feedback "underline book titles" the words "underline," "book," and "titles" may be lexical tokens.

As illustrated in FIG. 4, based on the lexical tokens, the feedback application 152 determines at least one noun phrase included in the reviewer feedback (at block 404). For example, the feedback application 152 may compare the lexical tokens with a dictionary, thesaurus, or both to identify what tokens represent noun phrases. Alternatively or in addition, the feedback application 152 may semantic information regarding the reviewer feedback, such as semantic indexing, to identify noun phrases. For example, using common sentences structures such as "<noun>, <verb>, <noun>" or "<verb>, <noun>," the feedback application 152 may identify a noun phrase included in the reviewer feedback. It should be understood that in some embodiments, the feedback application 152 may use an application programming interface (API) to parse the reviewer feedback. For example, the feedback application 152 may pass the reviewer feedback through the API and, in return, receive the lexical tokens included in the reviewer feedback, which may be categorized as whether each token is a noun, verb, modifier, or the like. Using the above example reviewer feedback, the noun phrase included in this feedback is represented by the token "titles."

The feedback application 152 similarly determines at least one verb phrase included in the reviewer feedback based on the tokens (at block 406). Again, the feedback application 152 may identify verb phrases based on sentence structures or by comparing the tokens to a dictionary or thesaurus, which in some embodiments may be a list of common verbs associated with editing (change, capitalize, delete, underline, indent, and the like).

Optionally, the feedback application 152 also determines at least one modifier included in the reviewer feedback based on the tokens (at block 408). A modify may modify a verb phrase, such as to negate a verb when the modifier is "No," "Don't," "Do not," or the like. Similarly, a modifier may modify a verb phrase or a noun phrase by providing additional filtering or exception information such as "all," "each," and the like. Again, the feedback application 152 may determine modifiers within the reviewer feedback by comparing the tokens to a predefined dictionary of words organized by word type, comparing the tokens to a thesaurus that maintains words with similar meanings, using semantic indexing which identifies tokens as particular types of words based on the position of the token relative to tokens with known types, or a combination thereof.

It should be understood that, in some embodiments, reviewer feedback may not include a noun phrase, a verb phrase, or a modifier. For example, reviewer feedback may be "capitalize" or may provide replacement text for text associated with the reviewer feedback without a verb. Similarly, reviewer feedback may only include a modifier when the requested edit only applies to some occurrences of particular content. Therefore, such a modifier may not be need depending on the reviewer feedback.

It should also be understood that the feedback application 152 may generalize or convert identified phrases as part of analyzing the reviewer feedback. For example, the feedback application 152 may convert tokens to lowercase, may remove formatting from tokens, remove redundant tokens, convert plural nouns to singular nouns, change the tense of a verb, may replace tokens with known synonyms, rewrite content in active voice, and the like. For example, when the reviewer feedback is "Between sentences, please stop adding extra spaces," the feedback application 152 may not only parse this phrase into tokens but may convert these tokens such that the resulting set of tokens is "remove," "extra space," "between," and "sentences." As described in more detail below, converting the reviewer feedback may allow make it easier for the reviewer feedback to interpret the phrases and determine the edit to apply the feedback. Similarly, if reviewer feedback includes more than one distinct requested edit, the feedback application 152 may analyze each requested edit separately.

As illustrated in FIG. 4, the feedback application 152 combines the at least one noun phrase, the at least one verb phrase, and any optional modifiers into a combined phrase (for example, in the order "<modifier>, <verb>, <noun>," "<verb>, <modifier>, <noun>," or the like depending on the presence of any modifiers and whether the modifiers modify the verb phrase or the noun phrase) (at block 410). The feedback application 152 then compares the combined phrase with each of a plurality of possible combined phrases (at block 412). In some embodiments, comparing the combined phrases with the possible combined phrases includes comparing the combined phrase or a portion thereof with a possible combined phrase or a portion thereof. The possible combined phrases may include phrases recognized by the feedback application 152 and each phrase may be associated with one or more actions the feedback application 152 should take to apply an edit associated with the possible combined phrase. For example, each possible combined phrase (or portions thereof) may be mapped to one or more actions for applying an edit. In particular, one of the possible combined phrases may include the tokens "Remove," "indent," and "paragraph" and may be linked with actions taken by the feedback application 152 to select a paragraph included in a data file and remove an indentation from the paragraph. Accordingly, when the feedback application 152 receives reviewer feedback of "Don't ever ident each paragraph," the feedback application 152 may determine a combined phrase for this feedback of "Remove," "indent," and "paragraph." When the feedback application 152 compares this combined phrase with the possible combined phrases, the feedback application 152 determines that the combined phrase matches the possible combined phrase "Remove," "indent," and "paragraph," and determines the actions associated with this possible combined phrase. It should be understood that the feedback application 152 may identify a match between a generated combined phrase and a predetermined possible combined phrase when the phrases are identical or when the phrases are not identical are similar such that the feedback application 152 can concluded that the phrases have the same meaning. For example, using the same converting described above for the tokens, the feedback application 152 determine whether a combined phrase can be converted to match a possible combined phrase.

In response to identifying a match between a generated combined phrase and a predetermined possible combined phrase (or a portion thereof as noted above) (at block 414), the feedback application 152 applies the edit associated with the possible combined phrase (at block 416). For example, as noted above, the possible combined phrase of "Remove," "indent," and "paragraph" may be associated with a set of functions for selecting a paragraph within the data file and removing an indent from the selected paragraph. Further details regarding applying edits are described below. As illustrated in FIG. 4, when the combined phrase fails to match any possible combined phrases, the feedback application 152 may generate an alert that may be displayed to a user (the author) (at block 418). The alert may inform the user that no edit could be identified based on the reviewer feedback. In some embodiments, the alert may also list feedbacks the feedback application 152 could recognize and apply. For example, when the feedback application 152 is unable to determine what type of edit should be applied in response to the reviewer feedback "Capitalization unnecessary," the feedback application 152 may display other feedback relating to capitalizing ("remove capitalization," "capitalize," and the like) and prompt the user whether he or she meant one of these related feedbacks.

Returning to FIG. 2, in response to determining an edit, the feedback application 152 applies the edit to the content included in the data file (at block 240). As described above, in some embodiments, upon determining an edit, the feedback application 152 may perform one or more actions to apply the edit to the content. The actions may include searching for and selecting particular content (text, structures, and the like) with in the data file and applying the edit to the selected content. As noted above, applying an edit may include changing text, changing the formatting of text or structures, adding links to the data file and the like. As noted above, in some embodiments, reviewer feedback is associated with a specific portion of content included in the data file. Accordingly, when applying the edit to the associated portion of the content, the feedback application 152 may search within the portion for content to edit. For example, when the reviewer feedback instructs an author to "italicize quoted text," the feedback application 152 may search for quoted text (text between two quote characters) within the content associated with the reviewer feedback and changing any determined text to italics.

As illustrated in FIG. 2, method 200 also includes determining additional content subject to the edit (at block 260). For example, as noted above, the reviewer feedback may be associated with a portion of content included in the data file but the reviewer feedback may apply to other portions. To determine such additional content, the feedback application 152 may search for applicable content within all content included in the data file or particular portions of content included in the data file. For example, when the reviewer feedback instructs an author to "italicize quoted text," the feedback application 152 may scan or search for quoted text within all of the text included in the data file (even if not associated with the reviewer feedback) and change any located text to italics as described above.

Figure 5:
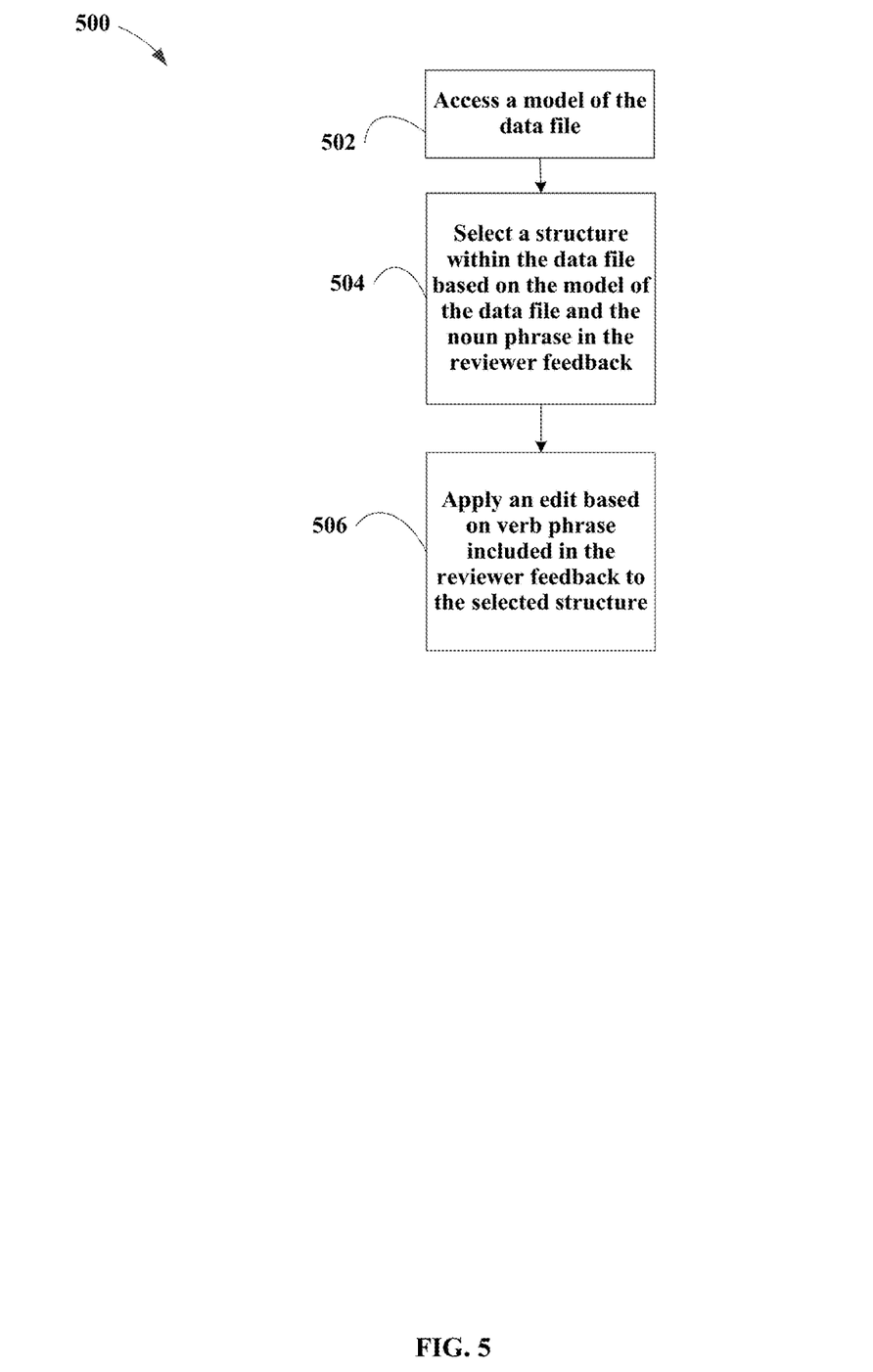
FIGS. 5 and 6 are flow charts illustrating methods for applying an edit to the content included in a data file performed by the system of FIG. 1 as part of the method of FIG. 2 according to some embodiments.

As another example, FIG. 5 illustrates a method 500 for determining additional content subject to an edit. In some embodiments, the feedback application 152 performs the method 500 when the edit includes formatting a particular section of a data file (regardless of the actual content included in the section of the data file). For example, as illustrated in FIG. 5, as part of the method 500, the feedback application 152 accessing a model of the data file (at block 502), such as a document object model. A document object model (sometimes referred to a DOM) defines objects within a data file, such as HTML, XHTML, and XML documents. Accordingly, model contains information about the content included in the data file as well as the organization of the content (for example, what chapters, pages, paragraphs, and sentences, and the like). Similarly, in some embodiments, the model contains information regarding formatting of the content included in the data file, such as text formatting including, for example, bolding, underlining, italics, and the like. The model may also include other content formatting information, such as margins, sections, headers and footers, page numbers, and the like.

Based on the model and the reviewer feedback (the noun phrase), the feedback application 152 select a structure within the data file (at block 504). For example, when the reviewer feedback includes the noun phrase "paragraph," the feedback application 152 may use the model to select all the paragraphs included in the file. Similarly, when the reviewer feedback includes the noun phrase "sections," the feedback application 152 may use the model to select all sections included in the data file.

After selecting the appropriate structure, the feedback application 152 applies the edit to the selected structure (at block 506). For example, when the reviewer feedback includes the verb phrase "increase indent" and the noun phrase "paragraphs," the feedback application 152 may increase the indent for each selected paragraph included in the data file. It should be understood that the feedback application 152 may use the method 500 to determine additional content subject to an edit after performing an initial edit within content associated with reviewer feedback as well as part of performing the initial edit. For example, when reviewer feedback is "Increase indentation of paragraph" but is associated with one sentence included in a paragraph, the feedback application 152 may access a model for the data file to determine the specific paragraph associated with the reviewer feedback.

Figure 6:
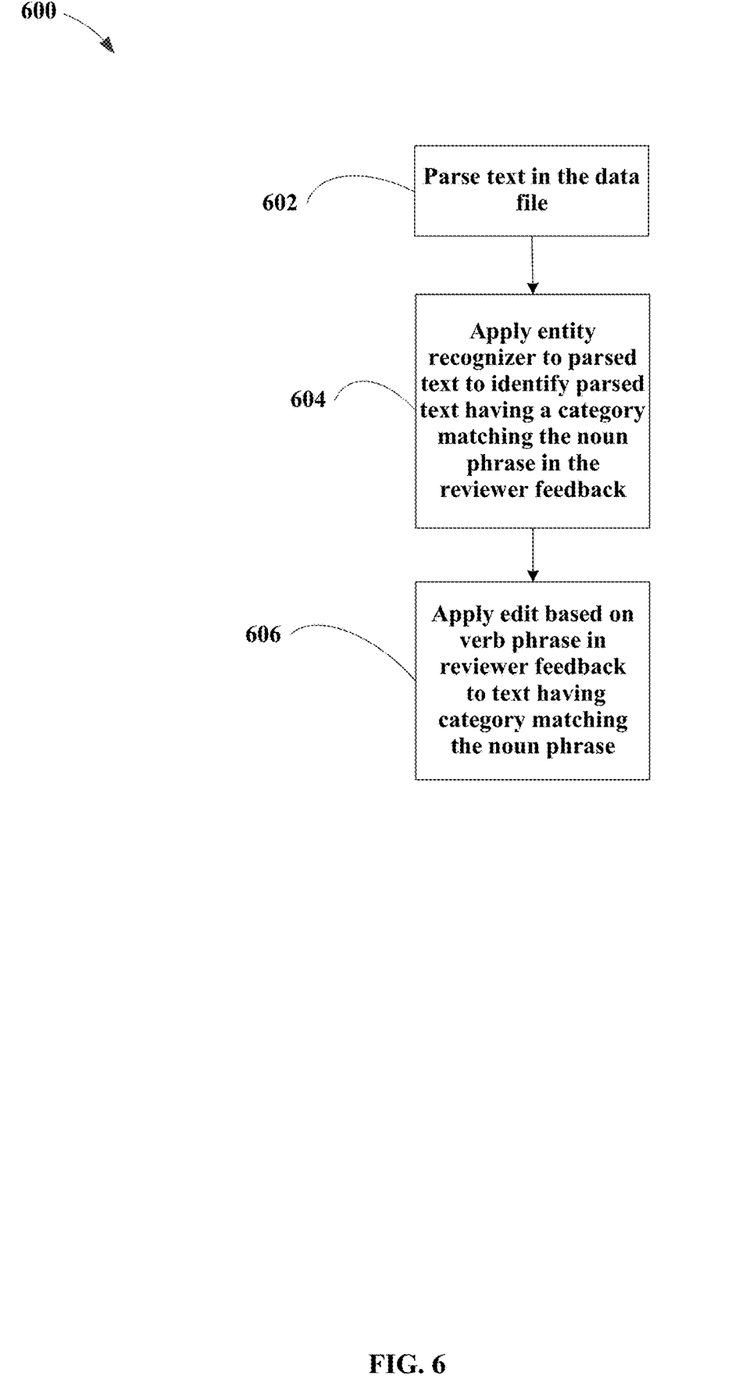

As another example, FIG. 6 illustrates a method 600 for determining additional content subject to the edit. In some embodiments, the feedback application 152 performs the method 600 when the edit includes formatting a particular category of text included in the data file. For example, when the reviewer feedback instructs an author to "Capitalize all names," or "Add a selectable link for all geographical locations," the feedback application 152 may perform the method 600 to determine names, locations, or other categories of text included in the data file. As illustrated in FIG. 6, the method 600 includes parsing (for example, separating into tokens) text within the data file into individual words or phrases (at block 602). The method 600 also includes applying an entity recognizer, such as the Stanford Named Entity Recognizer, to the parsed text to determine text having a category matching the reviewer feedback (at block 604), such as text having a category matching the noun phrase included in the reviewer feedback. An entity recognizer may categorize parsed text (tokens), such as by determining whether text represents a name, a location, or the like. In some embodiments, the entity recognizer uses a predetermined dictionary that maps particular text to a particular category. Using such a dictionary, however, may provide incomplete categorization. For example, a dictionary may only have well-known names, locations, etc. and may not be able to determine all names or locations within content. Accordingly, in some embodiments, the entity recognizer may categorize text based on the structure of text, such as sentence structure or other semantic information. In particular, the entity recognizer may determine a category of each word or phrase using a known sentence structure (for example, article-noun-verb-adverb). Entity recognizers are well known and, hence, their functionality is not described in detail herein.

When the feedback application 152 determines text having a category matching the reviewer feedback (at block 604), the feedback application 152 applies the edit to the text having the matching category (at block 606). For example, as described above, the feedback application 152 may update the text having the matching category based on the verb phrase in the reviewer feedback. In particular, when the reviewer feedback is "Capitalize all names," the feedback application 152 updates each name identified by the entity recognizer by capitalizing the first letter of each such name.

For example, consider the following examples. When the reviewer feedback is "Adorn all paragraphs with dropcaps," the feedback application 152 tokenizes the feedback into "Adorn" as the verb phrase, "all paragraphs" as the noun phrase, and "with dropcaps" as a modifier. It should be understood that, in general, a modifier may modify a noun phrase or a verb phrase (for example, "adorn (all paragraphs with dropcaps)" or "(adorn with dropcaps) (all paragraphs) "). Accordingly, the feedback application 152 may be trained (for example, using stemming algorithms like Snowball or Porter) to differentiate transitive verbs from intransitive verbs. Therefore, the feedback application 152 may determine that the verb "adorn" is an intransitive verb such that "adorn" follows the format "adorn" "something" "with something." Therefore, the feedback application 152 may be configured to rule out the first option and correlate the tokens as "(adorn with dropcaps) (all paragraphs)." The token "all paragraphs" falls in the same category with tokens like "any paragraph," "every paragraph," and the like, wherein the numeric modifier "all" implies occurrences without any filtering.

Based on these phrases, the feedback application 152 generates a combined phrase. As described above, the feedback application 152 may maintain a list of possible combined phrases. Accordingly, the feedback application 152 may compare the generated combined phrase to the possible combined phrases. The feedback application 152 may look for identical matches between the combined phrases or similarity between the combined phrases (or portions thereof). For example, the phrase "adorn with dropcaps" may fall in the same category as "apply <stuff> to," "decorate with <stuff>," "style with <stuff>," and the like. Thus, the feedback application 152 may use the possible phrases to translate the combined phrase into a recognized phrase. For example, the feedback application 152 may translate the <stuffy> token to a reduced form (for example, "dropcaps" become "dropcap."), determine if the reduced form of the token matches any preset style (in this case, "dropcap" may match "Dropcap"), and then apply the matched <stuff> to a selected portion of the data file.

For example, as described above, the feedback application 152 may access a model for the data file to select all paragraphs within the data file. In particular, word processing applications, such as Word® provided by Microsoft Corporation, may provide an application programming interface (API) to select all paragraphs from a document. The API may also provide a list of pre-set formatting or styles, which may include "dropcap." Accordingly, the feedback application 152 may use the API to not only select all paragraphs but also apply a dropcap.

Thus, in this example, the feedback application 152 automatically (without user interaction or interaction for each edit) applies the dropcap style to all paragraphs included in the data file, which may be hundreds or thousands of paragraphs.

It should be understood that the above example reviewer feedback does not include a negating modifier, such as "Don't," "no," or "stop." However, when the reviewer feedback includes such a negating modifier, the feedback application 152 may identify the same edit as described above but then may reverse the edit (remove any dropcap style from all paragraphs).

As another example, assume reviewer feedback is "Capitalize all names and locations." In this example, the feedback application 152 may tokenize the feedback into the noun phrase "all names and locations" and the verb phrase "Capitalize." The feedback application 152 may also determine that the noun phrase is a combination (because it includes a conjunction, such as "and" or "or"). Accordingly, the feedback application 152 may determine that the verb phrase should apply to both "names" and "locations." These nouns may have standard mappings in an entity recognizer as described above.

As "Capitalize" is a transitive verb, the feedback application may group this verb phrase with possible combination phrases such as "uppercase <stuff>," "lowercase <stuff>," and the like, which generally means take the "<stuff>" and do something to its case. It should be understood that the phrase "uppercase" may map to an edit of turning all characters in selected text to uppercase, "lowercase" may map to an edit of turning all characters in selected text to lowercase, and "capitalize" may map to an edit of turning a first character in selected text to uppercase. Accordingly, based on the "names" and "locations" determined by an entity recognizer as described above, the feedback application 152 applies an edit to text included in the data file (all selected text within a model of the data file). In some embodiments, the feedback application 152 may determine the selected text for applying the edit based on the type of edit being performed (based on the verb phrase defining the edit). For example, when the edit is capitalizing text, the entity recognizer may use a case insensitive model that looks for names and locations regardless of whether the first letter of the text is capitalized.

Again, there is no negation modifier in this example. However, when the reviewer feedback is "Don't capitalize names and locations," the feedback application 152 may analyze the reviewer feedback as described above and after determining the edit, may reverse the edit (turn the first letter of selected text to lowercase rather than uppercase). Accordingly, the feedback application 152, for particular possible combined phrases may store both an edit to apply when feedback matches the phrase as well as an opposite edit to apply when the feedback matches the phrase but includes a negation modifier.

As yet another example, assume the reviewer feedback is "Mark all places as map links." The feedback application 152 may tokenize this feedback into the noun phrase "all places and map links" and the verb phrase "mark." Again, the verb phrase "mark" is an intransitive verb, which has a usage form of "mark<A>" as "<B>," which indicates that <A> is to be transformed into <B>. In the above example reviewer feedback, "<A>" is "all places," which is included in the same category of phrases as "any <place>," "every <location>," and the like. In some embodiments, the feedback application 152 may track synonyms to determine that "place" and "location" are close synonyms in a noun context. For example, the feedback application 152 may use an API to determine synonyms for a noun included in feedback (when the noun doesn't match a list of known nouns used by the feedback application). Accordingly, the feedback application 152 maps the noun phrase "all places" to "place" (modifiers such as "all," "every," "each," and the like may be ignored as they mean no filtering or exclusion). Thus, as in the previous example, the feedback application 152 may select each location included in the content (or a specific portion of the content).

To apply the feedback "mark<A> to <B>," the edit is defined by <B>. In the above example feedback, <B> is "map links," which the feedback application 152 determines (through a mapping between noun phrases and associated actions) means taking as input a geographical location and returning at least on geographical coordinate for the geographical location. In some embodiments, the feedback application 152 uses an API to access geographical coordinates. For example, the feedback application 152 may pass a name of a geographical location (a city name, state name, country name, region name, landmark name, body of water name, street name, and the like) to a mapping API (such as Bing® Map provided by Microsoft Corporation), which returns at least one geographical coordinate for the geographical location.

Based on the received geographical coordinate, the feedback application 152 changes all occurrences of the name of the associated geographical coordinate to a selectable link, such as a hyperlink (for example, by adding the markup <place longitude="10" latitude="12">London</place> to the data file). In some embodiments, the file creation application 151 (or a separate file publishing application) may be configured to display such selectable text differently from text that is not associated with such a link, such as by displaying the text with an underline or in a different color than other text. When a user clicks on such a link, a map is displayed that illustrates the geographical coordinate. The map may be centered at the geographical coordinate (the latitude and latitude included in the markup). The map may be displayed within the same application displaying the content of the data file or may be displayed within a separate window. For example, in some embodiments, in response to a user selecting a location name within displayed content, the application displaying the content may open an inline popup link to display the associated map.

The above example has similar use cases for changing the names of historical persons or events (for example, Abraham Lincoln, Maradona, the American Civil War, and the like) to a selectable link that, when selected, opens a website, such as a reference website (for example, Wikipedia) or an official web site associated with person or event. Similarly, the above example may be used to mark a code snippet (a C++ code snippet) as link, such as an MSDN link. In some embodiments, the feedback application 152 may use supervised machine learning to perform such linking. Alternatively or in addition, the feedback application 152 may access a set of hardcoded uniform resource locator (URL) mappings based on individual APIs. For example, the MSDN API takes a keyword and return an appropriate URL documenting that keyword. Similarly, the Wikipedia API takes in a keyword as input and returns a URL to an article describing that keyword, and the Bing Map API takes a name of a geographical location as input and returns a longitude and latitude of the location as output. Thus, to add such a link to a data file, the feedback application 152 maps particular phrases included in reviewer feedback to particular APIs or URLs (for example, "Wikipedia links," "map locations," "map links," and "MSDN links"). Similarly, in some embodiments, as part of adding such a link to a data file, the feedback application 152 may be configured to map particular phrases to particular formats or configurations for a corresponding link, such as how the link is displayed. For example, the feedback application 152 may be configured to insert a MSDN link that that a new software application is opened to load a URL but insert a map link that is displayed as an inline popup without leaving the application displaying the content including the link. In some embodiments, a user (an author or a reviewer) may specify these configurations for the feedback application 152.

In some embodiments, a user (an author, a reviewer, or both) may control when or how edits are applied to content within a data file. For example, when a user (an author) is reviewing feedback provided by a reviewer, the feedback application 152 (or the file creation application 151) may display one or more selection mechanisms (buttons) selectable by the user (through one or more input devices 147) to control whether the feedback application 152 applies an edit. For example, as illustrated in FIG. 3, the user interface 300 may include an "Apply to content" button 334, an "Apply to all content" button 336, and an "Ignore" button 338 associated with the feedback dialog box 330. In response to the user selecting the "Apply to content" button, the feedback application 152 automatically applies an edit based on the feedback included in the feedback dialog box 330 as described above to the content associated with the feedback. For example, as illustrated in FIG. 3, the reviewer feedback "Capitalize abbreviations" is linked or associated with the content 625 (including the text "s.u"). Accordingly, in response to the user selecting the "Apply to content" button 334, the feedback application 152 automatically applies an edit to the content 625 as described above but does not apply the edit to other content. In contrast, in response to the user selecting the "Apply to all content" button 336, the feedback application 152 automatically applies an edit to the content 625 as well as other applicable content (the content 340, 350, and 360 as illustrated in FIG. 3). In response to the user selecting the "Ignore" button 338, the feedback application 152 may not apply any edits to the portion 325 or other portions of the content 320 and, in some embodiments, may delete or flag the reviewer feedback accordingly. It should be understood that the user interface 300 may also provide other selection mechanisms associated with the feedback dialog box 330 that a user may use to control the application of edits. For example, the user interface 300 may include a button that, when selected, marks each portion of the content that will be updated if the edit is automatically applied (so the user can manually review the edits before approving them). Also, in some embodiments, the user interface 300 may include a button that, when selected, cancels or reverses a previously-applied edit automatically applied by the feedback application 152.

Figure 7:
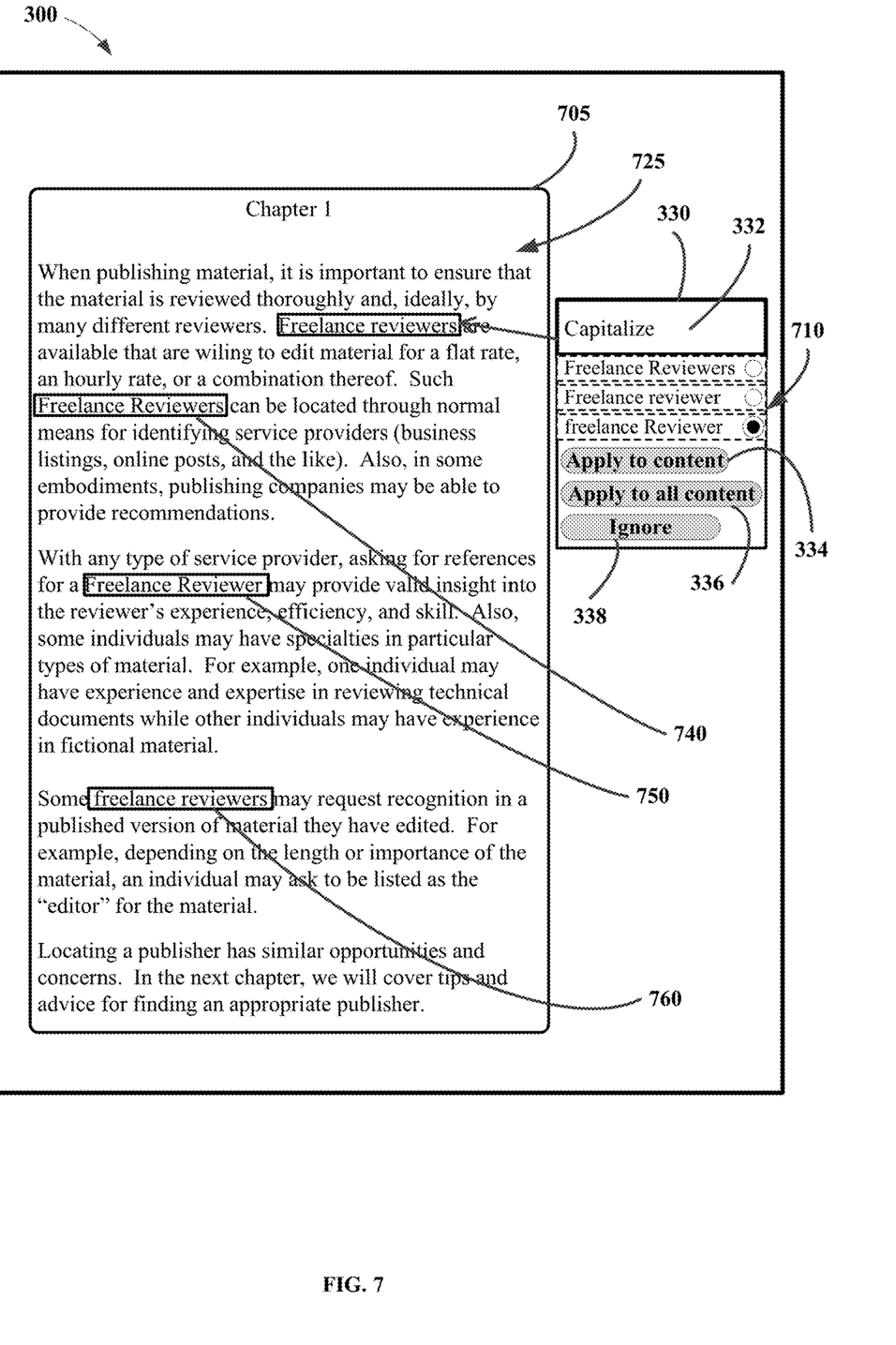
FIG. 7 illustrates a user interface for controlling application of reviewer feedback according to one embodiment.

Also, in some embodiments, when the feedback application 152 identifies an edit to apply to content within a data file, the feedback application 152 may display the edit to a user and prompt the user to approve or reject the edit. The feedback application 152 may prompt the user to approve all edits, no edits, or only edits satisfying predetermined criteria (for example, edits that include deleting content). Also, in some embodiments, the feedback application 152 may display a display a list of possible edits based on received reviewer feedback and allow a user to select what edit or option to apply. For example, as illustrated in FIG. 7, the user interface 300 may display content 705 and a feedback dialog box 330 as described above. In addition, the user interface 300 may display a plurality of buttons (radio buttons) 710, wherein each button may be associated with a different edit that may be automatically applied to content 725 associated with reviewer feedback 332 entered through the feedback dialog box 330. For example, when the feedback application 152 cannot determine a single edit that may correspond to the reviewer feedback 332, the feedback application 152 may list the possible edits within the user interface and allow the user to select the appropriate edit. In particular, as illustrated in FIG. 7, when the reviewer feedback 332 is "Capitalize" and is associated with content 725 that includes more than one word or phrase, the feedback application 152 may not be able to determine whether the first character of each word or phrase should be capitalized or whether only the first character of the one word or phrase should be capitalized. Accordingly, the feedback application 152 may display different capitalization options for the portion 325 and a button 710 for each option. Thus, the user can select the button that corresponds to the appropriate edit. Upon selection of one of the buttons 710, the feedback application 152 applies the selected edit to the content 725 and, optionally, to additional content 740, 750, and 760 as described above.

As illustrated in FIG. 7, in some embodiments, when the reviewer feedback only includes a verb phrase, the feedback application 152 may use the content associated with the reviewer feedback to determine the content or type of content that the verb phrase should apply to. For example, as the reviewer feedback illustrated in FIG. 7 only includes the verb phrase "Capitalize," the feedback application 152 search the content of the data file for other occurrences of the text associated with the reviewer feedback ("Freelance reviewers") to determine what other text included in the content 705 the feedback application 152 should capitalize. In some embodiments, the feedback application 152 also determine similar text, such as text with the same characters but in different cases (not capitalized), singular versions of the same text, the same text where the text includes a typographical error, and the like, as described above.

It should be understood that a user may control whether the feedback application 152 applies an edit at various stages of the method 200 illustrated in FIG. 2. For example, in some embodiments, the feedback application 152 may prompt the user approve or reject an edit before analyzing the reviewer feedback, after the feedback application 152 determines content subject to the reviewer feedback, after determining a specific edit for the content, or a combination thereof. Accordingly, in some embodiments, the feedback application 152 may automatically apply edits without requiring user manual interaction while, in other embodiments, the feedback application 152 may prompt a user at one or stages during determining and applying an edit for manual interaction.

Accordingly, the embodiments described herein reduce the amount of manual actions required by a user to edit a data file and reduces potential errors introduced through such a manual process. In particular, by analyzing reviewer feedback using natural language processing, reviewer feedback can be automatically applied while giving reviewers freedom to provide unstructured feedback and provide feedback that focus on style or consistency rather than or in addition to static grammatical rules or conventions. Furthermore, in some embodiments, the reviewer feedback may be automatically applied to multiple files, such as files authored by the same author, files representing individuals chapters or sections of the same document, or the like. Thus, even further efficiencies can be gained by automatically applying reviewer feedback to multiple files.

Various features and advantages of some embodiments are set forth in the following claims.

What is claimed is:

1. A system for editing data files, the system comprising:
a processor configured to
provide a user interface for receiving reviewer feedback from a reviewer for a first portion of content included in a data file, the user interface including at least two options for receiving the reviewer feedback, the two options including a dialog box and a list of one or more selectable historical reviewer feedbacks, the list of one or more selectable historical reviewer feedbacks including one or more previously received reviewer feedbacks;
receive a selection of a historical reviewer feedback from the list of one or more selectable historical reviewer feedbacks as the reviewer feedback for the first portion of content, the selected historical reviewer feedback specifying a category of text and an edit;
apply the edit to first text included in the first portion of the content included in the data file satisfying the category of text;
determine second text included in a second portion of the content included in the data file satisfying the category of text, wherein the category of text is not based on character similarity between the first text and the second text; and
apply the edit to the second text included in the second portion of the content included in the data file.

2. The system of claim 1, wherein the processor is further configured to:
receive second reviewer feedback associated with a second portion of the content included in the data file via the dialog box;
analyze the second reviewer feedback by:
separating the second reviewer feedback into a plurality of lexical tokens;
determining, based on the plurality of lexical tokens, a noun phrase included in the second reviewer feedback;
determining, based on the plurality of lexical tokens, a verb phrase included in the second reviewer feedback;
determining, based on the plurality of lexical tokens, a modifier included in the second reviewer feedback; and
determining an edit to content included in the data file based on the noun phrase, the verb phrase, and the modifier.

3. The system of claim 1, wherein the processor is configured to determine the second portion of the content included in the data file by accessing a document object model for the data file and selecting a structure within the document object model based on the edit.

4. The system of claim 3, wherein the processor is configured to select the structure within the document object model based on a noun phrase included in the reviewer feedback and is configured to apply the edit to the additional content included in the data file by updating the structure based on a verb phrase included in the selected historical reviewer feedback.

5. The system of claim 1, wherein the processor is configured to determine the second portion of the content included in the data file by parsing text included in the data file using an entity recognizer.

6. The system of claim 5, wherein the processor is configured to parse the text included in the data file using the entity recognizer to determine at least one phrase included in the data file having a category matching a noun phrase included in the selected historical reviewer feedback and wherein the processor is configured to apply the edit to the second portion of the content included in the data file by updating the at least one phrase included in the data file having the category matching the noun phrase based on a verb phrase included in the selected historical reviewer feedback.

7. The system of claim 1, wherein the processor is configured to apply the edit by displaying the edit to a user;
receiving an approval of the edit from the user; and
in response to receiving the approval of the edit, applying the edit to the content included in the data file.

8. The system of claim 1, wherein the processor is configured to apply the edit to the content included in the data file by changing text included in the content.

9. The system of claim 1, wherein the processor is configured to apply the edit to the content included in the data file by changing formatting of the content.

10. The system of claim 1, wherein the processor is configured to apply the edit to the content included in the data file by adding a selectable link to the content.

11. A method of applying edits to data files, the method comprising:
receiving reviewer feedback associated with a data file the reviewer feedback specifying a category of text and an edit;
analyzing, with a processor, the reviewer feedback using natural language processing to determine the category of text and the edit by:
separating the reviewer feedback into a plurality of lexical tokens,
determining, based on the plurality of lexical tokens, a noun phrase included in the reviewer feedback, the noun phrase specifying the category of text,
determining, based on the plurality of lexical tokens, a verb phrase included in the reviewer feedback, the verb phrase specifying the edit,
combining the noun phrase and the verb phrase to generate a combined phrase,
comparing the combined phrase to each of a plurality of possible combined phrases, and
in response to the combined phrase matching a possible combined phrase included in the plurality of possible combined phrases, determining the edit to the data file based on the possible combined phrase;
determining a first portion of content included in the data file including first text having a category matching the noun phrase; and
updating the first text included in the first portion based on the verb phrase included in the reviewer feedback;
determining a second portion of the content included in the data file including second text having a category matching the noun phrase, wherein the category of text is not based on character similarity between the first text and the second text; and
updating the second text based on the verb phrase included in the reviewer feedback.

12. The method of claim 11, wherein determining the second portion of the content included in the data file includes accessing a document object model for the data file and selecting a structure within the document object model based on the noun phrase included in the reviewer feedback.

13. The method of claim 12, wherein updating the second text included in the first portion includes updating the structure based on the verb phrase included in the reviewer feedback.

14. The method of claim 11, wherein determining the second portion of the content included in the data file includes parsing text included in the data file using an entity recognizer.

15. The method of claim 11, further comprising:
providing a user interface for receiving the reviewer feedback, the user interface including a dialog box for receiving the reviewer feedback and a list of predetermined reviewer feedbacks, wherein the list of predetermined reviewer feedbacks is based on historical reviewer feedback.

16. Non-transitory, computer-readable medium including instructions executable by a processor to perform a set of functions, the set of functions comprising:
receiving reviewer feedback associated with text included in a data file, the reviewer feedback specifying a category of text and an edit,
analyzing the reviewer feedback using natural language processing to determine the category of text and the edit by:
separating the reviewer feedback into a plurality of lexical tokens,
determining, based on the plurality of lexical tokens, a noun phrase included in the reviewer feedback, the noun phrase specifying the category of text, and
determining, based on the plurality of lexical tokens, a verb phrase included in the reviewer feedback, the verb phrase specifying the edit;
determining a first portion of content in the data file including first text having a category matching the noun phrase;
updating the first text included in the first portion based on the verb phrase included in the reviewer feedback;
determining a second portion of the content included in the data file having second text having a category matching the noun phrase, wherein the category of text is not based on character similarity between the first text and the second text; and
updating the second text included in the second portion based on the verb phrase included in the reviewer feedback.

17. The non-transitory, computer-readable medium of claim 16, wherein determining the second portion of the content included in the data file includes determining a name of a geographical location within the second portion using an entity recognizer and wherein updating the second text included in the second portion includes obtaining at least one coordinate for the geographical location, and adding the at least one geographical coordinate to the second text.

18. The non-transitory, computer-readable medium of claim 17, wherein adding the at least one coordinate to the second text includes adding a markup including the at least one geographical coordinate to the data file associated with the second text.

19. The non-transitory, computer-readable medium of claim 16, wherein determining the second portion of the content includes accessing a document object model of the data file and selecting a structure included in the data file and wherein updating the second text included in the second portion includes updating the structure included in the data file, wherein the structure included in the data file includes at least one selected from a group consisting of a sentence, a paragraph, a section, and a page included in the data file.

* * * * *